(12) United States Patent
Danto

(10) Patent No.: US 9,039,101 B1
(45) Date of Patent: May 26, 2015

(54) AIRCRAFT HUBCAP STRUCTURE

(76) Inventor: Peter Danto, Lafayette, CA (US)

( * ) Notice: Subject to any disclaimer, the term of this patent is extended or adjusted under 35 U.S.C. 154(b) by 644 days.

(21) Appl. No.: 13/408,491

(22) Filed: Feb. 29, 2012

(51) Int. Cl.
*B60B 7/00* (2006.01)
*B60B 7/06* (2006.01)

(52) U.S. Cl.
CPC .............. *B60B 7/0013* (2013.01); *B60B 7/06* (2013.01); *B60B 7/061* (2013.01)

(58) Field of Classification Search
CPC .......... B60B 7/0013; B60B 7/02; B60B 7/06; B60B 7/061; B60B 7/065; B60B 7/066; B60B 7/068; B60B 7/10; B60B 7/14
USPC ............... 301/37.101, 37.102, 37.34, 37.106, 301/37.371, 37.372, 37.373, 37.376, 108.1, 301/108.4
See application file for complete search history.

(56) References Cited

U.S. PATENT DOCUMENTS

| | | | | |
|---|---|---|---|---|
| 3,854,448 A | * | 12/1974 | Kromanaker | 118/505 |
| 5,020,861 A | * | 6/1991 | Gorges | 301/108.1 |
| 5,643,167 A | * | 7/1997 | Simmons | 493/464 |
| 6,595,596 B1 | * | 7/2003 | Polka | 301/37.102 |
| 8,720,369 B2 | * | 5/2014 | Rayman et al. | 118/505 |
| 2005/0264090 A1 | * | 12/2005 | Kaczynski et al. | 301/6.1 |

* cited by examiner

*Primary Examiner* — S. Joseph Morano
*Assistant Examiner* — Jean Charleston
(74) *Attorney, Agent, or Firm* — Thomas R. Lampe

(57) ABSTRACT

A dome-shaped hubcap is attached to a wheel half of an airplane wheel and tire assembly by a plurality of attachment brackets, the attachment brackets being mounted on bolts passing through preexisting openings formed in the wheel wall of the wheel half.

19 Claims, 4 Drawing Sheets

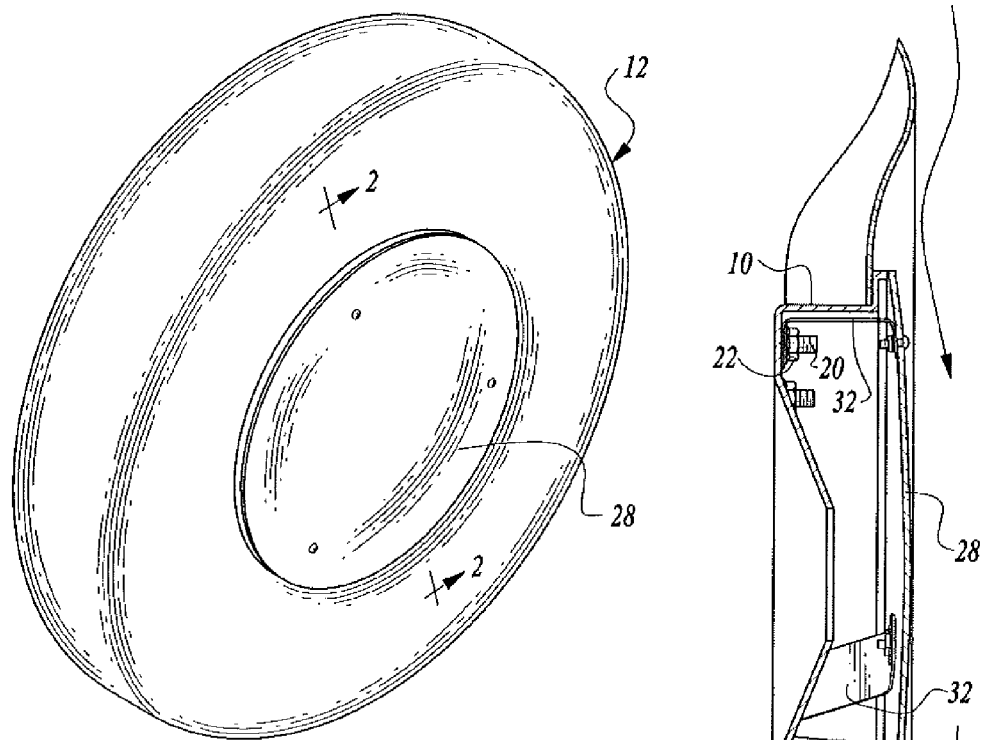
Fig. 1
Fig. 2
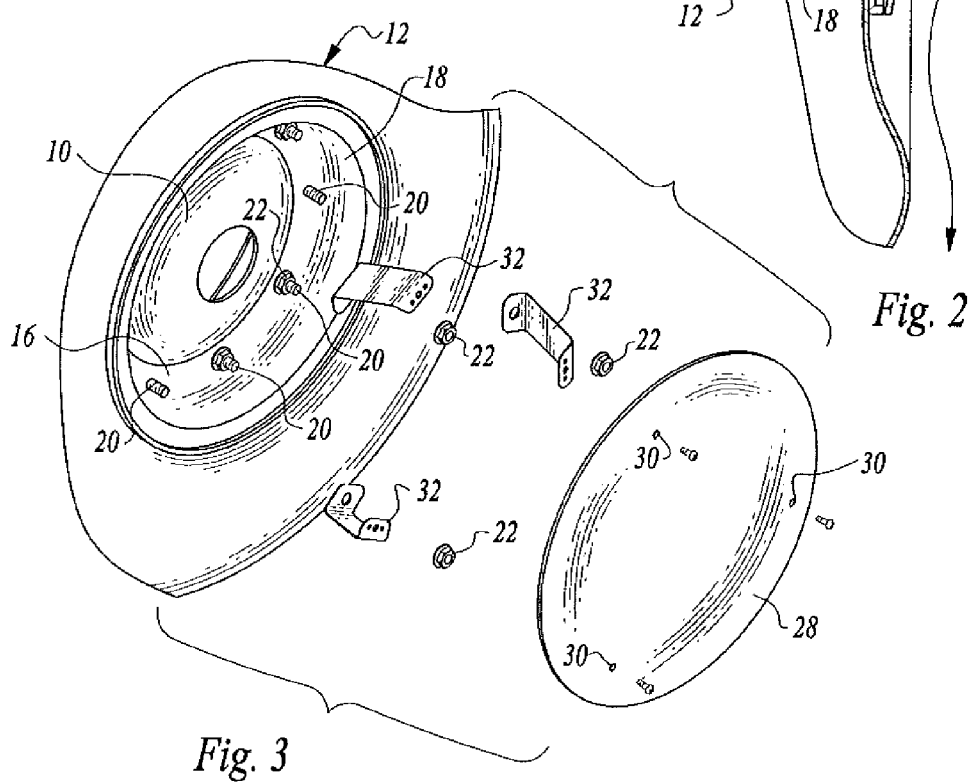
Fig. 3

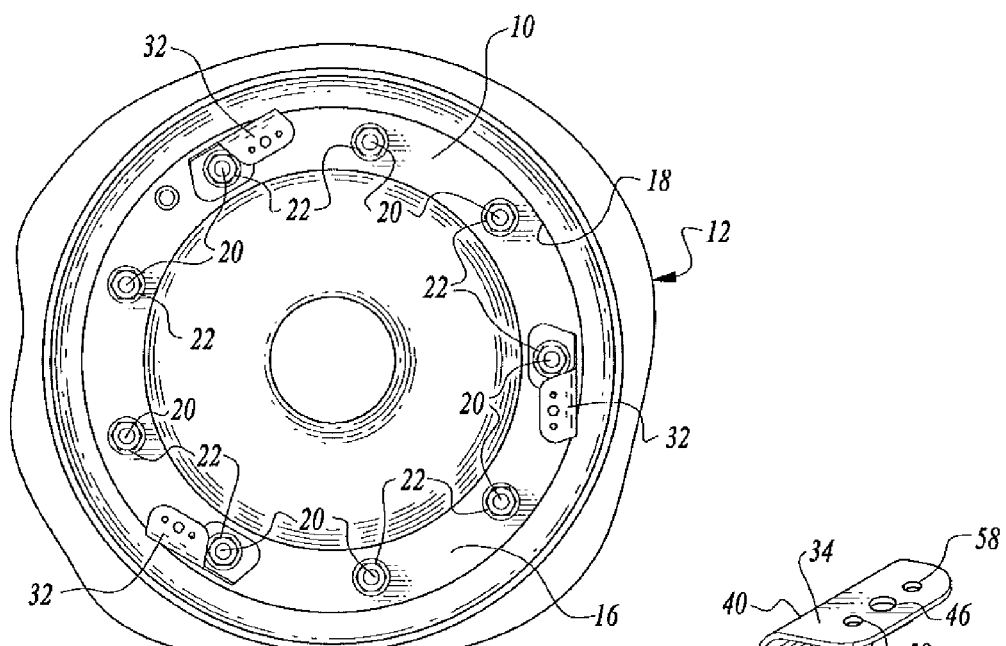
*Fig. 4*
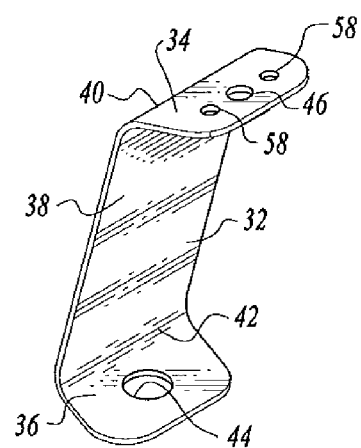
*Fig. 5*
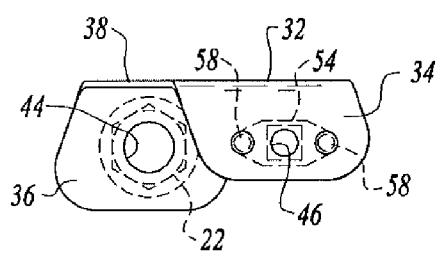
*Fig. 6*
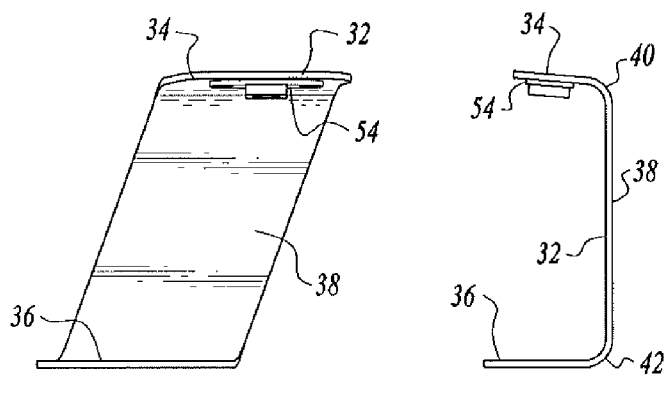
*Fig. 7*   *Fig. 8*
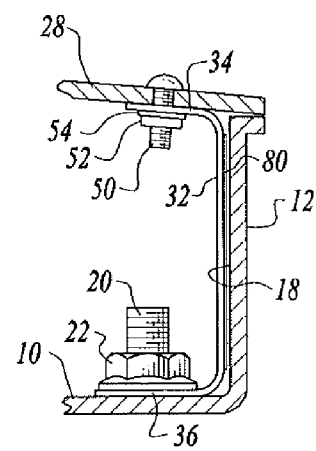
*Fig. 9*

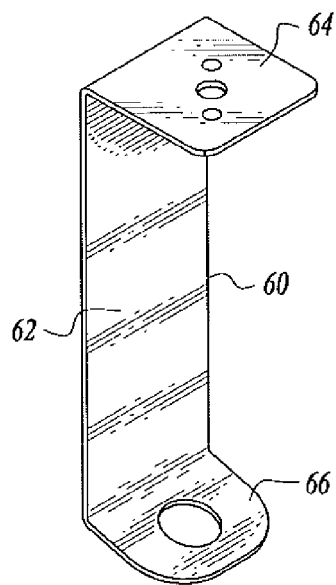
Fig. 10
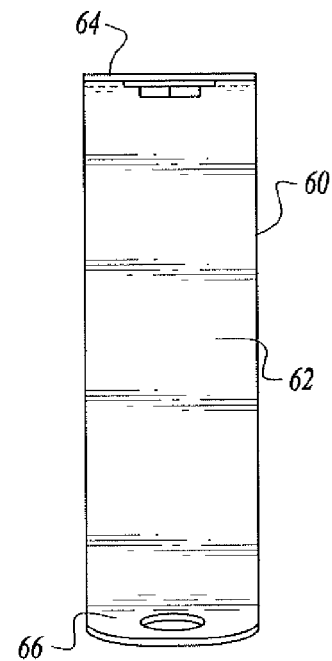
Fig. 12
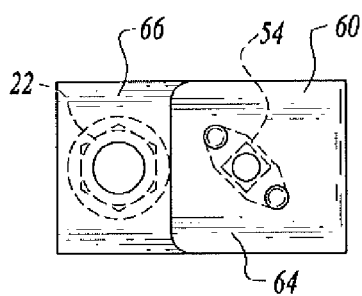
Fig. 11
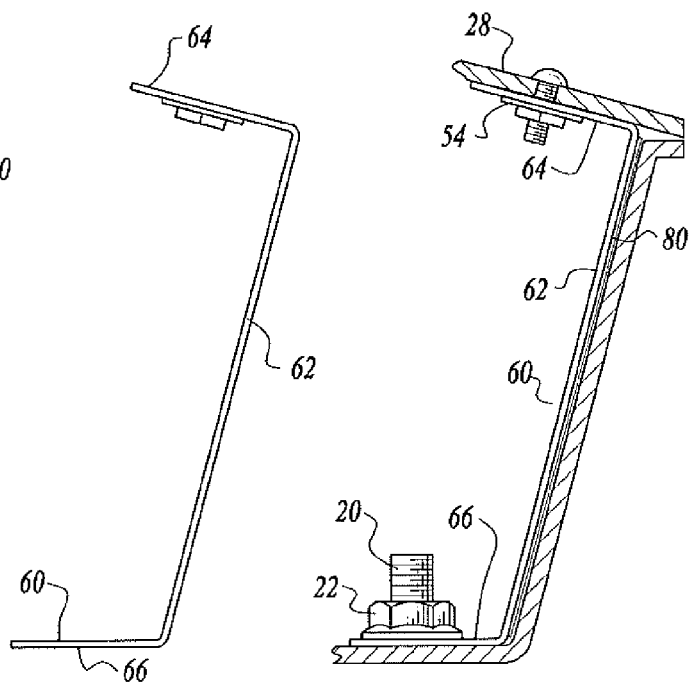
Fig. 13
Fig. 14

AIRCRAFT HUBCAP STRUCTURE

TECHNICAL FIELD

This invention relates to aircraft wheels and more particularly to aircraft hubcap structure for attachment to a wheel half of an airplane wheel and tire assembly.

BACKGROUND OF THE INVENTION

The main wheels of certain aircraft have exposed wheel halves on the outer surface of the wings when the landing gear is retracted. This arrangement interrupts airflow past the wheel and consequent diminishment of aerodynamics, performance and operation safety. Diminished aerodynamics adversely impact aircraft speed (in knots) and rate of climb (in feet per minute).

DISCLOSURE OF INVENTION

With the aircraft hubcap structure of the present invention airflow over the hubcap and the airplane wheel and tire assembly is optimized. Good airflow is good aerodynamics, resulting in better performance and safer operations. With the present invention an increased speed and rate of climb are provided. Safety is enhanced through utilization of the present invention since better climb is critical in emergency operations where an engine may be shut down and the aircraft climbs on one engine. Another scenario is when the engine or engines fail and the plane is a glider. Lower drag means better glide and more options available for landing safely. The present invention provides these advantages as well as others which will be pointed out below.

The present invention relates to aircraft hubcap structure for attachment to a wheel half of an airplane wheel and tire assembly, the wheel half including a wheel wall of circular configuration and a cylindrical rim affixed to the wheel wall, surrounding the wheel wall and projecting outwardly from the wheel wall.

The wheel wall defines a plurality of preexisting bolt holes spaced from one another and adjacent to the cylindrical rim for receiving bolts employed to interconnect the wheel half to another structure of the wheel and tire assembly.

The aircraft hubcap structure includes a dome-shaped hubcap having a circular-shaped periphery and a circumference exceeding the circumference of the wheel half, the dome-shaped hubcap defining a plurality of spaced hubcap holes.

The aircraft hubcap structure further includes a plurality of attachment brackets, each attachment bracket including first and second bracket end portions and a bracket intermediate portion between the bracket end portions and integral therewith. The first bracket end portion of each of the attachment brackets defines an opening for receiving a bolt extending through a bolt hole of the wheel half for securement thereto by a nut. The second bracket end portion of each of the attachment brackets defines an opening for receiving a mechanical connector extending through a hubcap hole for securing the hubcap to the second bracket end portion.

The dome-shaped hubcap completely covers the wheel half when the wheel half and the dome-shaped hubcap are connected together by the attachment brackets.

The attachment brackets of the invention allow installation of the system without modification of the wheel and tire assembly. This is an important factor since the wheels are tested and certified under a specific design. Drilling or revising the wheel renders the wheel un-air worthy and the impact of such modifications unknown. This could have catastrophic results on a hard landing. The attachment brackets are attached to the outer wheel half by bolts extending through previously existing and approved bolt holes. The aircraft hubcap structure disclosed and claimed herein works extremely well in all aircraft where the landing gear retracts into the wing but leaves the wheel and tire uncovered. This is fairly common since the simplicity of eliminating an additional gear door makes the structure simpler and more reliable.

Other features, advantages and objects of the present invention will become apparent with reference to the following description and accompanying drawings.

BRIEF DESCRIPTION OF DRAWINGS

FIG. 1 is a perspective view illustrating the hubcap of the aircraft hubcap structure of the present invention in position on a wheel half of an airplane wheel and tire assembly;

FIG. 2 is an enlarged, cross-sectional view taken along the line 2-2 of FIG. 1 and illustrating with arrows the smooth airflow resulting from use of the invention;

FIG. 3 is an exploded, perspective view illustrating a portion of the airplane wheel and tire assembly with components of the aircraft hubcap structure in position prior to attachment to the wheel half;

FIG. 4 is a front, elevational view illustrating brackets of the aircraft hubcap structure of the present invention assembled in place and attached to the wheel half;

FIG. 5 is a perspective view of an attachment bracket utilized in the aircraft hubcap structure, the outer end portion of the bracket having countersunk rivet holes;

FIG. 6 is a top, plan view of the attachment bracket and illustrating by dash lines the positioning of the bracket relative to a nut and washer utilized to secure the attachment bracket to the wheel half;

FIG. 7 is a front, elevational view of the attachment bracket with a floating nut plate riveted thereto;

FIG. 8 is a side, elevational view of the attachment bracket and floating nut plate;

FIG. 9 is a side, elevational view of the attachment bracket and floating nut plate connected at the upper end thereof to an illustrated segment of the dome-shaped hubcap of the invention and connected at the bottom end thereof to an illustrated segment the wheel half;

FIG. 10 is a view similar to that of FIG. 5, but illustrating a second embodiment of attachment bracket, the outer end portion of the bracket having countersunk rivet holes;

FIG. 11 is a view similar to FIG. 6 of the second embodiment of attachment bracket;

FIG. 12 is a view similar to FIG. 7 of the second embodiment of attachment bracket with a floating nut plate riveted thereto;

FIG. 13 is a view similar to FIG. 8 of the second embodiment of attachment bracket and floating nut plate;

FIG. 14 is a view similar to FIG. 9 illustrating the second embodiment of attachment bracket and floating nut plate connected to illustrated segments of the dome-shaped hubcap and half wheel;

MODES FOR CARRYING OUT THE INVENTION

Figure 15:
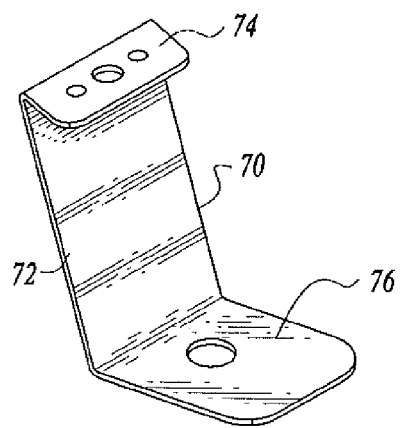
FIG. 15 is a view similar to FIGS. 5 and 10 illustrating a third embodiment of attachment bracket, the outer end portion of the bracket having countersunk rivet holes.

Referring now to FIGS. 1-9, a wheel half 10 of an airplane wheel and tire assembly 12 is illustrated. The assembly is representative of a typical assembly employed in aircraft. More specifically, wheel half 10 is the outer wheel half.

The wheel half 10, which is of conventional construction, includes a wheel wall 16 of circular configuration and a cylindrical rim 18 affixed to the wheel wall, surrounding the wheel wall and projecting outwardly from the wheel wall.

The wheel wall defines a plurality of bolt holes spaced from one another and adjacent to the cylindrical rim receiving bolts 20 which are employed to interconnect the wheel half to other structure of the wheel and tire assembly, nuts 22 being utilized for such purpose.

FIG. 3 shows nuts 22 removed from three of the bolts. It is to be understood that the bolt holes within which the bolts reside, are preexisting, being formed in the wheel half when it is manufactured in accordance with established regulatory and testing requirements. The present invention utilizes some of these same bolts passing through preexisting holes, or replacement bolts of like character passing through preexisting holes, to secure a hubcap in place in the manner now to be described.

The aircraft hubcap structure of the present invention includes a dome-shaped hubcap 28 having a circular-shaped periphery and a diameter substantially equal to the diameter of the wheel half 10. The dome-shaped hubcap defines a plurality of spaced hubcap holes 30, more specifically in this case, three hubcap holes.

The aircraft hubcap structure also includes a plurality of attachment brackets 32, also three in number in the embodiment illustrated. It will be appreciated however that different numbers of attachment brackets may be utilized for the purpose of attaching the hubcap to the wheel wall.

Each attachment bracket 32 includes a bracket end portion 34 and a bracket end portion 36. A bracket intermediate portion 38 is located between the bracket end portions and integral therewith. In the embodiment illustrated, bracket 32 comprises a bent strip of aviation grade steel. Bends 40, 42 respectively, separate bracket end portions 34, 36 from the bracket intermediate portion 38.

Bracket end portion 36 defines an opening 44 for receiving a bolt 20 extending through a bolt hole of the wheel half for securement thereto by a nut 22. It is to be understood that the nut 22 used for such purpose has been removed and then reapplied to the bolt after the bracket end portion is mounted on the bolt. This may be seen in FIG. 3 wherein three nuts have been removed from three bolts and wherein three attachment brackets are to be installed. Alternatively, replacement nuts of like character can be employed.

Bracket end portion 34 of each of the attachment brackets defines an opening 46 for receiving a mechanical fastener (in the form of a screw in the embodiment illustrated) extending through a hubcap hole 30 for securing the hubcap to the bracket end portion 34. FIG. 9 shows a screw 50 serving such purpose, screw 50 passing through the hubcap 28 and through bracket end portion 34, being secured thereto by a nut 52 of a floating nut plate 54 attached to the bottom of bracket end portion 34. Aircraft rivets passing through countersunk rivet holes 58 in the bracket end portion 34 are employed to attach the floating nut plate with the rivet outer surfaces flush with the outer surface of the bracket end portion 38.

When the dome-shaped hubcap 28 is installed it completely covers the wheel half as shown in FIGS. 1 and 2 but does not extend beyond the wheel half.

In the embodiment illustrated in FIGS. 1-9, the bracket intermediate portion 38 is canted sideways relative to both the bracket end portion 34 and the bracket end portion 36. The bracket end portions are offset relative to one another and project laterally from a surface of the bracket intermediate portion in substantially the same direction. The bracket end portions 34, 36 are each generally orthogonally disposed relative to the bracket intermediate portion in this embodiment.

The offset of the bracket end portions allows a torque wrench or other suitable tool (not shown) to be utilized when securing the nuts 22 to bolts 20 during installation of the attachment brackets without interference by bracket end portion 34. As can be seen in FIG. 9 wherein the nut position is illustrated by dash lines, the nut is readily accessible for using a tool.

The attachment brackets are coated with cadmium II or other suitable aircraft industry coating for minimizing corrosion potential caused by engagement between the attachment brackets with the wheel half or other components of the aircraft hubcap structure.

FIGS. 1 and 2 illustrate the dome-shaped hubcap 28 installed in place, with FIG. 2 illustrating by means of arrows the smooth airflow that takes place after installation of the hubcap. The hubcap is preferably formed of fiberglass or composite material, however other suitable materials may be utilized. Teflon tape 80 is secured to the surface of the bracket intermediate portion 38 to prevent direct contact between the metal bracket cylindrical rim 18 to further minimize corrosion potential caused by contact of dissimilar metals It is to be understood that aircraft wheels come in different sizes and shapes and different sizes and shapes of attachment brackets may be utilized.

FIGS. 10-14 illustrate an attachment bracket embodiment 60 having an intermediate portion 62 longer than the intermediate portion of the first embodiment. Also, the bracket is not canted sideways, but rather is slanted or inclined in an outward direction so that the bolt holes of the outermost and innermost bracket end portions 64, 66, respectively, are displaced relative to one another. As was the case with the first embodiment, in this second embodiment, access by a tool to the nut 22 at innermost bracket end portion 66 is not interfered with by the outermost bracket end portion 64.

Figure 16:
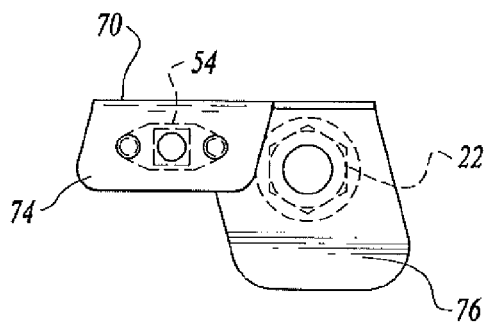
FIG. 16 is a view similar to FIGS. 6 and 11 illustrating the third embodiment of attachment bracket.
Figure 17:
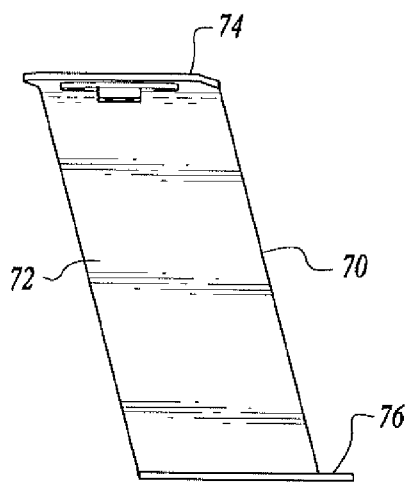
FIG. 17 is a view similar to FIGS. 7 and 12 illustrating the third embodiment of attachment bracket with a floating nut plate riveted thereto.
Figure 18:
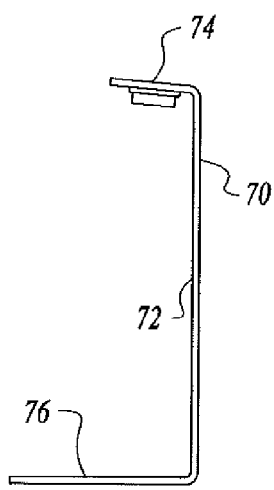
FIG. 18 is a view similar to FIGS. 8 and 13 of the third embodiment of attachment bracket and floating nut plate.
Figure 19:
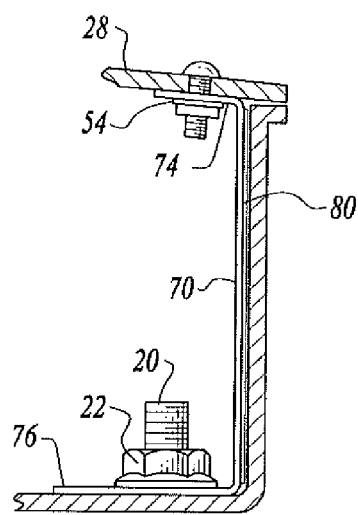
FIG. 19 is a view similar to FIGS. 9 and 14 illustrating the third attachment bucket embodiment and floating nut plate connected to illustrated segments of the dome-shaped hubcap and half wheel.

FIGS. 15-19 illustrate a third embodiment of attachment bracket designated by reference numeral 70. Attachment bracket 70 intermediate portion 72 is canted sideways to displace the openings in outermost bracket end portion 74 and innermost bracket end portion 76 relative to one another, the shapes of the bracket end portions 74, 76 differing from one another and differing from the bracket end portions of the other attachment bracket embodiments described above.

Attachment bracket configurations other than those specifically illustrated can be utilized without departing from the spirit or scope of the present invention.

The invention claimed is:

1. Aircraft hubcap structure for attachment to a wheel half of an airplane wheel and tire assembly, said wheel half including a wheel wall of circular configuration and a cylindrical rim affixed to said wheel wall, surrounding said wheel wall and projecting outwardly from said wheel wall, said wheel wall defining a plurality of preexisting bolt holes spaced from one another and adjacent to said cylindrical rim for receiving bolts employed to interconnect said wheel half to other structure of said wheel and tire assembly, said aircraft hubcap structure including, in combination:
    a dome-shaped hubcap having a circular-shaped periphery and a diameter substantially equal to the diameter of said wheel half, said dome-shaped hubcap defining a plurality of spaced hubcap holes; and
    a plurality of attachment brackets, each attachment bracket including first and second bracket end portions and a bracket intermediate portion between said bracket end portions and integral therewith, the first bracket end portion of each of said attachment brackets defining an opening for receiving a bolt extending through a bolt hole of the wheel half for securement thereto by a nut, and the second bracket end portion of each of said attachment brackets defining an opening for receiving a mechanical connector extending through a hubcap hole for securing said hubcap to said second bracket end portion, said dome-shaped hubcap completely covering said wheel half when said wheel half and said dome-shaped hubcap are connected together by said attachment brackets, said bracket intermediate portion canted sideways relative to both said first bracket end portion and said second bracket end portion, and said first bracket end portion and said second bracket end portion being offset relative to one another.

2. The aircraft hubcap structure according to claim 1 wherein each of said attachment brackets comprises a bent strip of metal.

3. The aircraft hubcap structure according to claim 2 wherein bends in said strip separate said first and second bracket end portions from said bracket intermediate portion.

4. The aircraft hubcap structure according to claim 3 wherein said first and second bracket end portions project laterally from a surface of said bracket intermediate portion in substantially the same direction.

5. The aircraft hubcap structure according to claim 4 wherein said first and second bracket end portions are each generally orthogonally disposed relative to said bracket intermediate portion.

6. The aircraft hubcap structure according to claim 4 wherein said dome-shaped hubcap has a convex, smoothly curved outer surface to promote smooth airflow past the wheel half to reduce drag and otherwise improve aerodynamics.

7. The aircraft hubcap structure according to claim 1 wherein said attachment brackets are formed of aviation grade steel.

8. The aircraft hubcap structure according to claim 1 wherein said attachment brackets are coated with a preventive coating for eliminating corrosion potential caused by engagement between said attachment brackets with the wheel half or other components of the aircraft hubcap structure.

9. The aircraft hubcap structure according to claim 1 additionally including a floating nut plate attached to the second end portion of each attachment bracket, said mechanical connector threadedly engaging the nut of said floating nut plate.

10. In combination:
    a wheel half of an airplane wheel and tire assembly, said wheel half including a wheel wall of circular configuration and a cylindrical rim affixed to said wheel wall, surrounding said wheel wall and projecting outwardly from said wheel wall, said wheel wall defining a plurality of preexisting bolt holes spaced from one another and adjacent to said cylindrical rim for receiving bolts employed to interconnect said wheel half to other structure of said wheel and tire assembly; and
    aircraft hubcap structure, said aircraft hubcap structure including a dome-shaped hubcap having a circular-shaped periphery and a diameter substantially equal to the diameter of said wheel half, said dome-shaped hubcap defining a plurality of spaced hubcap holes, and a plurality of attachment brackets, each attachment bracket including first and second bracket end portions and a bracket intermediate portion between said bracket end portions and integral therewith, the first bracket end portion of each of said attachment brackets defining an opening receiving a bolt extending through a bolt hole of the wheel half and secured thereto by a nut, and the second bracket end portion of each of said attachment brackets defining an opening receiving a mechanical connector extending through a hubcap hole securing said hubcap to said second bracket end portion, said dome-shaped hubcap completely covering said wheel half when said wheel half and said dome-shaped hubcap are connected together by said attachment brackets, said bracket intermediate portion canted sideways relative to both said first bracket end portion and said second bracket end portion, and said first bracket end portion and said second bracket end portion being offset relative to one another.

11. The combination according to claim 10 wherein each of said attachment brackets comprises a bent strip of metal.

12. The combination according to claim 11 wherein bends in said strip separate said first and second bracket end portions from said bracket intermediate portion.

13. The combination according to claim 12 wherein said first and second bracket end portions project laterally from a surface of said bracket intermediate portion in substantially the same direction.

14. The combination according to claim 13 wherein said first and second bracket end portions are each generally orthogonally disposed relative to said bracket intermediate portion.

15. The combination according to claim 13 wherein said dome-shaped hubcap has a convex, smoothly curved outer surface to promote smooth airflow past the wheel half to reduce drag and otherwise improve aerodynamics.

16. The combination according to claim 10 wherein said attachment brackets are coated with a preventive coating for eliminating corrosion potential caused by engagement between said attachment brackets with the wheel half or other components of the aircraft hubcap structure.

17. The combination according to claim 10 additionally including a floating nut plate attached to the second end portions of each attachment bracket, said mechanical connector threadedly engaging the nut of said floating nut plate.

18. Aircraft hubcap structure fore attachment to a wheel half of an airplane wheel and tire assembly, said wheel half including a wheel wall of circular configuration and a cylindrical rim affixed to said wheel wall, surrounding said wheel wall and projecting outwardly from said wheel wall, said wheel wall defining a plurality of preexisting bolt holes spaced from one another and adjacent to said cylindrical rim for receiving bolts employed to interconnect said wheel half to other structure of said wheel and tire assembly, said aircraft hubcap structure including, in combination:
    a dome-shaped hubcap having a circular-shaped periphery and a diameter substantially equal to the diameter of said wheel half, said dome-shaped hubcap defining a plurality of spaced hubcap holes; and
    a plurality of attachment brackets, each attachment bracket including first and second bracket end portions and a bracket intermediate portion between said bracket end portions and integral therewith, the first bracket end portion of each of said attachment brackets defining an opening for receiving a bolt extending through a bolt hole of the wheel half for securement thereto by a nut, and the second bracket end portion of each of said attachment brackets defining an opening for receiving a mechanical connector extending through a hubcap hole for securing said hubcap to said second bracket end portion, said dome-shaped hubcap completely covering said wheel half when said wheel half and said dome-shaped hubcap are connected together by said attachment brackets, each of said attachment brackets comprising a bent strip of metal and bends in said strip separating said first and second bracket end portions from said bracket intermediate portion, said first and second bracket end portions projecting laterally from a surface of said bracket intermediate portion in substantially the same direction, said aircraft hubcap structure additionally including tape applied to said bracket intermediate portion of each attachment bracket for preventing direct engagement of the bracket intermediate portion with said rim to lessen the likelihood of corrosion formation.

19. In combination:

a wheel half of an airplane wheel and tire assembly, said wheel half including a wheel wall of circular configuration and a cylindrical rim affixed to said wheel wall, surrounding said wheel wall and projecting outwardly from said wheel wall, said wheel wall defining a plurality of preexisting bolt holes spaced from one another and adjacent to said cylindrical rim for receiving bolts employed to interconnect said wheel half to other structure of said wheel and tire assembly; and aircraft hubcap structure, said aircraft hubcap structure including a dome-shaped hubcap having a circular-shaped periphery and a diameter substantially equal to the diameter of said wheel half, said dome-shaped hubcap defining a plurality of spaced hubcap holes, and a plurality of attachment brackets, each attachment bracket including first and second bracket end portions and a bracket intermediate portion between said bracket end portions and integral therewith, the first bracket end portion of each of said attachment brackets defining an opening receiving a bolt extending through a bolt hole of the wheel half and secured thereto by a nut, and the second bracket end portion of each of said attachment brackets defining an opening receiving a mechanical connector extending through a hubcap hole securing said hubcap to said second bracket end portion, said dome-shaped hubcap completely covering said wheel half when said wheel half and said dome-shaped hubcap are connected together by said attachment brackets, each of said attachment brackets comprising a bent strip of metal, and bends in said strip separating said first and second bracket end portions from said bracket intermediate portion, first and second bracket end portions projecting laterally from a surface of said bracket intermediate portion in substantially the same direction with the first and second bracket end portions each generally orthogonally disposed relative to said bracket intermediate portion, and said combination additionally including tape applied to said bracket intermediate portion of each attachment bracket for preventing direct engagement of the bracket intermediate portion with said rim to lessen the likelihood of corrosion formation.

\* \* \* \* \*